United States Patent [19]

Takenoya et al.

[11] Patent Number: 4,932,345
[45] Date of Patent: Jun. 12, 1990

[54] METHOD OF SETTING SPACING BETWEEN CHARACTERS EMBROIDERED BY AN EMBROIDERING SEWING MACHINE

[75] Inventors: Hideaki Takenoya; Reishi Nomoto, both of Tokyo, Japan

[73] Assignee: Janome Sewing Machine Co., Ltd., Tokyo, Japan

[21] Appl. No.: 286,384

[22] Filed: Dec. 16, 1988

[30] Foreign Application Priority Data

Dec. 25, 1987 [JP] Japan .................. 62-326749

[51] Int. Cl.$^5$ .................................... D05B 21/00
[52] U.S. Cl. ......................... 112/266.1; 112/121.12; 112/262.3; 112/103; 112/454
[58] Field of Search ........... 112/266.1, 262.3, 121.12, 112/454, 102, 103, 78, 98

[56] References Cited

U.S. PATENT DOCUMENTS 4,522,138  6/1985  Takenoya et al. ............... 112/266.1
4,742,786  5/1988  Hashimoto et al. ............. 112/121.12

Primary Examiner—Peter Nerbun
Attorney, Agent, or Firm—Michael J. Striker

[57] ABSTRACT

A method of setting visually balanced spacing between characters to be embroidered by an embroidering sewing machine in which character forming information which is stored with a preset reference size is successively read out and the characters are displayed and aligned between two parallel line segments. The aligned characters are first arranged in such a manner that the contours of consecutive characters contact each other at least at one point. Then the space areas between characters are calculated and a maximum area of the calculated space areas is set as a reference space area; then increasing the distances between the characters such that the other space areas between the characters become equal to the reference space area; and finally arranging the characters at spacings which have been increased by a computed minimum distance.

5 Claims, 4 Drawing Sheets

1 : Select letters
2 : Store letters in combination by the combination memory key
3 : Arrange letters by operating the combination finish key so that letters contact at their parts
4 : Calculate the space area between letters by the distance information within the letter forming information
5 : Make a maximum space area between letters a reference space area
6 : Calculate, store and indicate the letters-distance, an amending amount and a minimum letters-distance, so that the space area between letters is the reference space area
8 : Make the reference space area the letters-distance of the adjusted value and make other areas the letters-distance by adding the amending amount
9 : Calculate and store the needle dropping data by the letter forming information and the letters-distance
10 : Start embroidering stitching by operating the start key

FIG_1

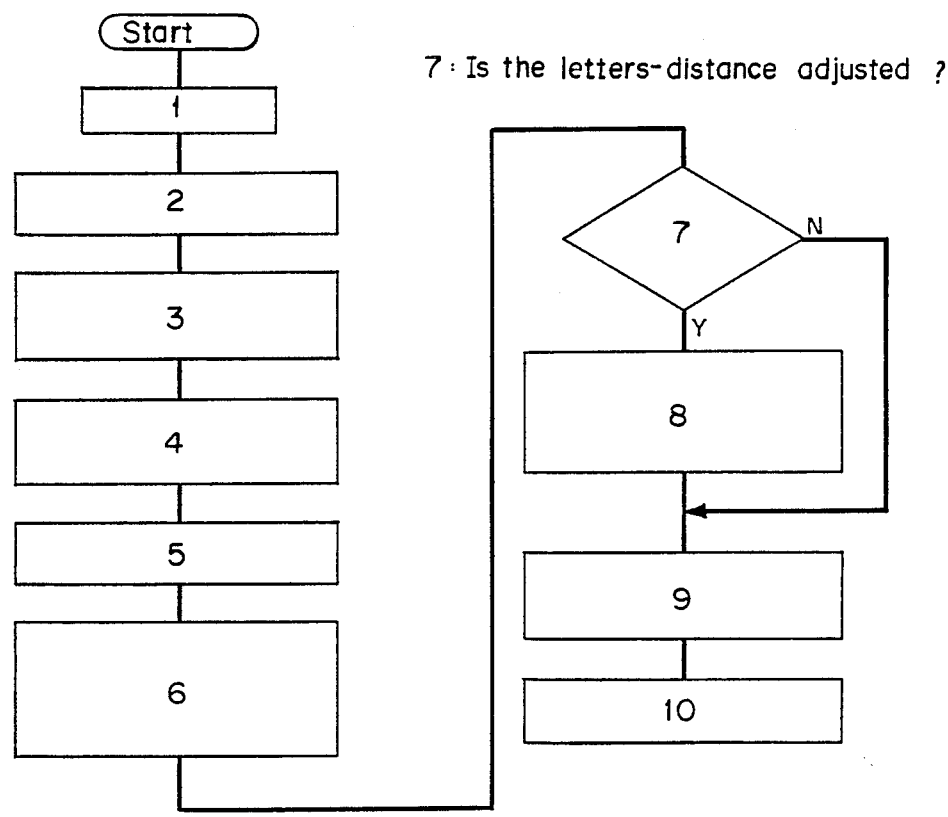

1 : Select letters
2 : Store letters in combination by the combination memory key
3 : Arrange letters by operating the combination finish key so that letters contact at their parts
4 : Calculate the space area between letters by the distance information within the letter forming information
5 : Make a maximum space area between letters a reference space area
6 : Calculate, store and indicate the letters-distance, an amending amount and a minimum letters-distance, so that the space area between letters is the reference space area
8 : Make the reference space area the letters-distance of the adjusted value and make other areas the letters-distance by adding the amending amount
9 : Calculate and store the needle dropping data by the letter forming information and the letters-distance
10 : Start embroidering stitching by operating the start key

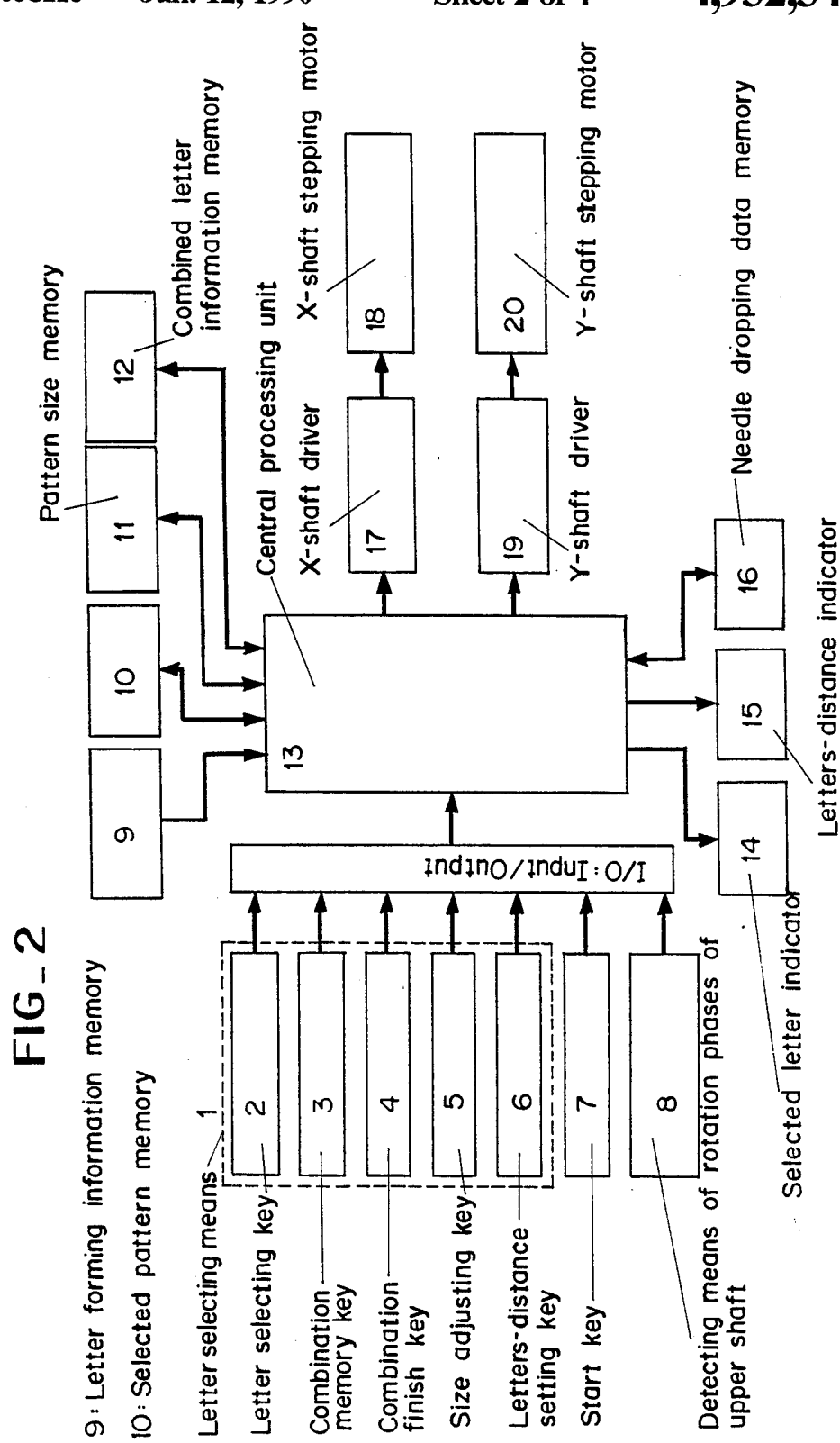

FIG_3
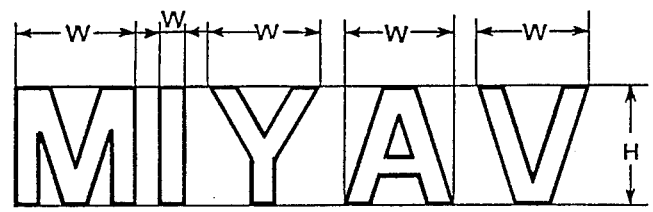
FIG_4
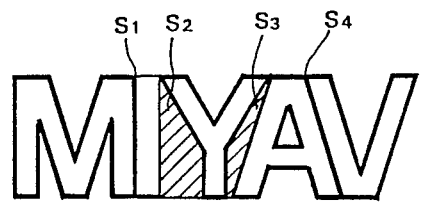
FIG_7
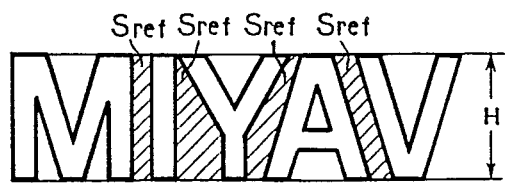
FIG_8
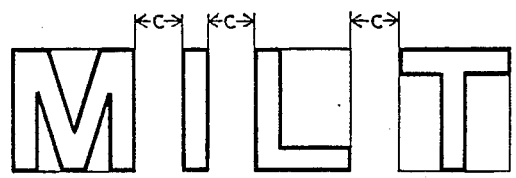
FIG_9
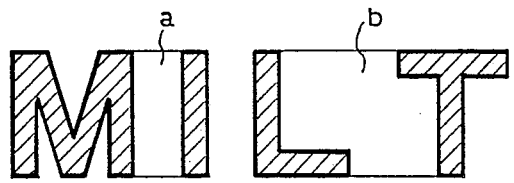

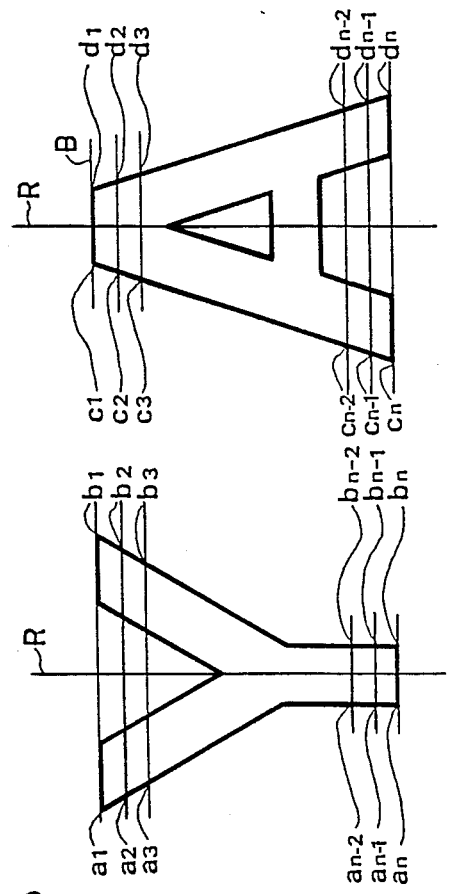
FIG_5
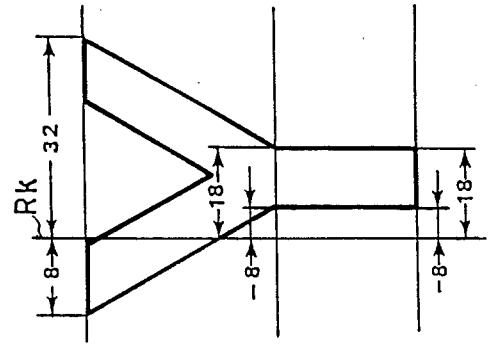
FIG_6(c)
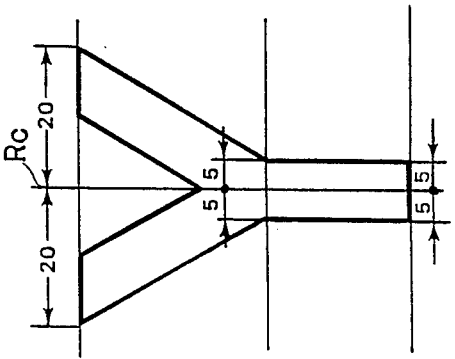
FIG_6(b)
FIG_6(a)

METHOD OF SETTING SPACING BETWEEN CHARACTERS EMBROIDERED BY AN EMBROIDERING SEWING MACHINE

BACKGROUND OF THE INVENTION

The present invention relates to a method of setting spacing between characters embroidered by an embroidering sewing machine, and in particular to a method of arranging the spacings between adjacent characters in a series of characters to be embroidered.

Character forming information for an embroidering sewing machine is generally processed by setting a rectangular frame which is contiguous to or larger than the external contour of a character as shown in FIG. 8 and by using the rectangular frames when arranging the characters. That is, a method is adopted in which the characters are arranged without superimposing the frames or they are arranged after setting the distances between frames as a constant space value C.

If the characters are arranged by using such a method, some of the characters are arranged too close as shown by space a in FIG. 9 and other characters are too far apart as shown by space b in FIG. 9 so that the finished embroidered series of characters looks very unbalanced in appearance as a whole.

This unbalance is due to the difference in size of the rectangular frame for each character and pattern.

OBJECT OF THE INVENTION

It is an object of the present invention to provide a method of arranging characters in a series is which visually well balanced.

SUMMARY OF THE INVENTION

In an aspect of the present invention, there is provided a method of setting spacing between selected characters to be embroidered by an embroidering sewing machine in which corresponding character forming information which is stored with a preset reference size is successively read out and the characters are displayed.

According to the invention, the method comprises the steps of arranging the characters in alignment between two parallel line segments in such a manner that the contours of consecutive characters contact with each other at least at one point; individually calculating space areas between the contacting characters; setting a maximum area of the calculated space areas as a reference space area; increasing the distances between characters delimiting the other space areas such that the other space areas become equal to the reference space area; and arranging the characters at spacings which have been increased by a minimum distance value.

In another aspect of the present invention, there is provided a method of setting spacing between characters embroidered by an embroidered sewing machine in which the step of calculating the space areas between characters includes the steps of setting reference lines at substantially central positions of the characters, said lines being normal to a direction of character arrangement; setting a plurality of contour specifying lines at spaced relationship normally to the character arrangement direction; calculating the distance information on the distance between the reference line and external contour of the character along the contour specifying lines; adding the information corresponding to distance information at opposing sides of adjacent characters; and calculating the space areas between characters by collecting the added value.

BRIEF DESCRIPTION OF THE DRAWING

FIG. 1 is a flow chart explaining a method for presetting inter-character spacings;

FIG. 2 is a block diagram showing a control for a embroidering sewing machine;

FIG. 3 is a view showing external contours of different characters;

FIG. 4 is a view explaining a preparatory character arrangement in the method of this invention;

FIG. 5 is a view explaining the preparation for calculation of the space area;

FIGS. 6(a) to 6(c) are views explaining the presetting of the distance between characters FIG. 7 is a view explaining the final rearrangement of characters to provide visually balanced space areas between consecutive characters;

FIGS. 8 and 9 are views explaining conventional character arrangement.

DESCRIPTION OF THE PREFERRED EMBODIMENT

An embodiment of the present invention will be described in details with reference to the drawings.

It will be described by way of an example in which patterns to be embroidered are capital consecutively arranged alphabetic characters such as "M", "I", "Y", "A" and "V".

FIG. 2 is a block circuit diagram showing an embroidering sewing machine in accordance with the present invention. The detailed description of the block circuit is omitted herein since the sewing machine using this control block is disclosed in the Japanese patent application No.61-33790 which was filed by the assignee of the present application.

In general, a character selection means 1 comprises a character selection key 2 which selects the character forming information stored in advanced in storing means 9, a combination storing key 3 for displaying the characters selected by the character selection key 2 on a selected character indicating or displaying means 14 and for combining the selected characters to store the combination in a selected pattern storing means 10, a combination termination key 4 for commanding the termination of the character combination, a size adjusting key 5 for changing the size of the selected character, an inter-character spacing setting key 6 for setting the spacing between the character to be combined, and a start key 7 for starting the embroidering sewing. Each key is connected with a central processing unit 13 through an input/output I/O.

Reference numeral 8 represents a sensing means for the phase of an upper shaft. This sensing means is a conventional phase sensing means which comprises a photo-interrupter and a rotary disc secured to the upper shaft which is a driving shaft for moving upward and downward a needle of the embroidering sewing machine.

Reference numeral 9 represents means for storing the character forming information, 11 represents means for storing the size of the adjusted pattern and 12 represents combined character information storing means for storing the preset value of the inter-character spacing preset by the actuation of the inter-character presetting key 6 and for displaying the preset spacing indicator or on the inter-character spacing display means 15.

Reference numeral 16 represents needle location data storing means for storing the needle location data which are calculated from the inter-character spacing stored in the selected pattern storing means 11 10 and means for storing the size of the adjusted pattern 11.

Reference numeral 17 represents a driver for X-axis. The driver 17 and a driver for Y-axis 19 are connected with the central processing unit 13. The drivers 17 and 19 generate driving pulses to an X and Y-axis stepping motors 18 and 20, respectively, to drive the same in accordance with phase detected by means for detecting the rotational phase of the upper shaft, that is, the detection of the phase in which the needle is positioned above a fabric to be worked and in accordance with the needle location data stored in the needle location data location means 16 by the actuation of the start key 7.

A method for presetting the spacing between characters will be described with a reference to the flow chart of the FIG. 1 by way of an example in which capital alphabetic characters "M", "I", "Y", "A" and "V" are arranged in a visually well balanced series achieved by using the thus programmed control block of the embroidering sewing machine.

By actuating the character selecting key 2 and the combination key 3, the character information is read out from the character storing means 9 and displayed on the character displaying means 14 and stored in the selected pattern storing means 10.

The character information which is stored in the character storing means 9 includes external contour which is provided with a reference width W and a reference height H of the embroidering sewing (as shown in FIG. 3) and standard needle location information.

The external contour of the character forming information which was read by the selection and combination operation is arranged in alignment between two line sectors 511 and 512 with a part of each character being in contact with each other as shown in FIG. 4.

In such an arrangement, the space area S1 between "M" and "I" is 0, the space area between "I" and "I" is S2, the space area between "Y" and "A" is S3, the space area S4 between "A" and "V" is 0 as shown in FIG. 4. p Accordingly, the arrangement as shown in FIG. 4 in which the characters are partially contacted with each other provides visual unbalance due to differences among space areas S1 to S4.

Then the unbalance of space areas between characters is adjusted. The sizes of respective space areas between consecutive characters which at least partially contact with each other are calculated.

Explanation will be made by way of an example in which the space area between characters "Y" and "A" is calculated. Firstly a reference line R is preset for each character as shown in FIG. 5. The reference line R is normal to a character alignment direction.

Then a plurality of contour specifying lines an, bn and cn, dn which normally cross at right angles to the reference line R are preset. The contour specifying lines are preset at locations common to all aligned characters.

The contour specifying positions of the external contour on the contour specifying lines are plotted. One group of the contour specifying positions on the contour specifying lines for each character at the side of sewing direction is defined as A. The group of contour positions at opposite side of sewing direction is defined as [A].

The contour specifying positions are represented by a distance from the reference line R. The distance information of each character is represented by the groups A and [A]. In other words, as shown in FIG. 6(a), the reference line $R_c$ is preset at approximately central position along the width of the character "Y" and the contour specifying lines B are preset at three levels such as upper, lower and intermediate levels. The contour specifying positions on the upper level contour specifying line are 20 and 20, respectively. The contour specifying positions on the contour specifying lines at the lower and intermediate levels are 5 and 5, respectively. Thus the group A is (20,5,5), the group [A] is (20,5,5) and the distance information is (20,5,5,5,5,20). Accordingly, the distance information is represented as (8,−8,−8,18,18,32) if the reference line $R_k$ is preset by being shifted from the center as shown in FIG. 6b.

A method for determining the inter-character space area upon the basis of the distance information determined as mentioned above will be described.

In FIG. 5, the contour specifying lines for the characters Y and A are preset as 1 to n, the contour specifying positions are specified as a,b,c, and d. Hence the distance information of the characters "Y" is (a1,a2,a3---an,bn,bn−1,---b3,b2,b1) and the distance information of the character A is (c1,c2,c3,---,cn,dn,dn−1, --- d3,d2,d1).

In an arrangement of characters "A" "Y" and are parts which are contacted with each other. The contact position of the contour specifying lines is a position where the total value (b+c) of the contour specifying positions at the sides (b and c) of the adjacent characters "Y" and "A" correspond to the each other as shown in FIG. 4. That is, the maximum e max is calculated in accordance with the following formulae and defined as K;

$$
\begin{aligned}
b1 + c1 &= e1 \\
b2 + c2 &= e2 \\
b3 + c3 &= e3 \\
&- \\
&- \\
&- \\
bn + cn &= en
\end{aligned}
$$

The maximum total value K is a minimum distance between characters at which adjacent characters are not superimposed.

In FIG. 5, e1 is K.

Accordingly the inter-character space area S can be represented by the following formula;

$$S = \sum_{n=1}^{\infty} (K - bn - cn) \times t \tag{1}$$

Similarly inter-character areas S1, S2, S4 are determined.

Maximum space area among the inter-character space areas S1 to S4 is preset as a reference space area S ref in the character string (MIYAV) arranged according to FIG. 4. In such a character string, S2 is designated the maximum space area and is made the reference inter-character space area S ref.

In other words, if the height of the character is represented as H, the minimum inter-character distance L min in this arrangement is S2/H. The correction V of the inter-character a distance can be represented by the following formula:

$$V = \frac{S2 - S}{H} \quad (2)$$

An example in which the characters are arranged to provide corrected reference space areas S1 ref by using this correction V is shown in FIG. 7.

Accordingly, after the combination termination key 4 is actuated, the central processing unit 13 reads out character information stored in the character information storing device 9 and the distance information defined by contour specifying positions on the predetermined contour specifying line to calculate the inter-character space area S. the minimum inter-character distance L min and the correction V of the distance between the characters so the these values are stored in the combined character information storing means 12 and the mimimum inter-character distance L min is displayed on the character spacing displaying means 15.

The operation of presetting a desired inter-character distance will be described. When a preset value L of the desired inter-character distance larger than the minimum inter-character distance L min displayed on the character spacing display means 15 is preset by actuating the inter-character distance presetting key 6, the inter-character distance is enlarged by a difference between the preset value L and minimum inter-character distance L min and is stored in the combined character information storing means 12 and the preset value L is displayed on the character spacing display means 15. From a value of the pattern size storing means 11 which stores the size of the pattern adjusted by the actuation of the pattern size adjusting key 5 and the character information stored in the combined character information storing means 12, needle location data are calculated and stored in the needle location data storing means 16.

After the actuation of the start key 7, a detection signal of the detection means 8 of the upper axis phase causes the X and Y-axis drivers 17 and 19 to generate drive pulses to drive the X and Y-axis stepping motors 18 and 20, respectively to form an embroidery embroidered seam. In aforementioned embodiment, the maximum value of the inter-character space areas in the combined character chain is preset as a reference inter-character space area S ref. However it is possible that a plurality of maximum reference space areas are stored in a memory to be selectively employed depending upon specific combinations of selected characters to be sewn. In this case, the inter-character space area is determined by individually calculating the inter-character space areas in the way as described above, and then by adding to or subtracting from each of the calculated inter-character space areas the difference between the reference space area and each of the calculated inter-character space area.

Pattern information and external distance information is preset in advance for each character in the embroidering sewing machine of the present invention as mentioned above. Characters are arranged so that the space areas between the consecutive characters are the same by calculating the space areas between characters in response to the selection operation and presetting of combination arrangement. Accordingly, visual unbalance of the character spacing in finished embroidering embroidered arranged characters can be eliminated and a well balanced character arrangement is obtained.

What is claimed is:

1. A method for setting a space between selected characters to be embroidered by an embroidering sewing machine in which corresponding character forming information which is stored with a preset reference size is successively read out and displayed, comprising the steps of:
   individually, calculating space areas between characters when the characters are arranged in contact with each other;
   setting a maximum area of the calculated space areas as a reference space area;
   increasing the distance between characters delimiting the other space areas such that the other space areas become equal to the reference space area; and
   arranging the characters at spacings which have been increased by a minimum distance.

2. A method of setting spacing between selected characters to be embroidered by an embroidering sewing machine as defined in claim 1,
   in which the step of calculating the space areas between characters includes the steps of setting reference lines at substantially central positions of the characters, said lines being nornal to a direction of the character alignment; setting a plurality of contour specifying lines at spaced relationship, said contour specifying lines extending in the character alignment direction; calculating the distance information on the distance between a reference line and external contour of a character along the contour specifying lines; adding the information corresponding to the distance information at opposing sides of adjacent characters to obtain an added value; and calculating the space areas between characters by using the added value.

3. A method as defined in claim 1 wherein the minimum distance is determined as a quotient of the reference space area and a height factor of the characters.

4. A method for setting a space between characters to be sewn by an embroidery sewing machine in which character forming information is stored with a preset reference size and characters to be sewn are successively read out, comprising the steps:
   (a) selecting a plurality of characters to be sewn;
   (b) arranging the selected characters in alignment between two parallel segment lines in such a manner that the adjacent contours of the characters are in contact with each other at least at one point to thereby provide space areas defined by the two parallel segment lines and the adjacent contours of the characters;
   (c) individually calculating the space areas between the characters;
   (d) setting a maximum area of the calculated space areas as a reference area; and
   (e) rearranging the characters with space areas corresponding to the reference area.

5. The method as defined in claim 4 wherein the steps of individually calculating the space areas between the characters include the steps of: setting reference lines passing substantially through center portions of the adjacent characters respectively and being vertical to the two parallel segment lines; setting a plurality of spaced lines each perpendicular to the reference lines to thereby provide a plurality of sets of contour segments between the adjacent characters, extending from the reference lines to the adjacent contours of the adjacent characters; individually calculating a total length of each set of the contour segments; setting a maximum total length of the calculated total lengths; subtracting the calculated total length of each set of the contour segments from the maximum total length; and adding the differences between the maximum total length and each of the calculated total lengths to the reference area.

* * * * *